Jan. 18, 1966          G. J. BATTAGLIA                    3,229,607
               PHOTOGRAPHIC PRODUCTS, PROCESSES AND APPARATUS
Filed March 19, 1963                                    2 Sheets-Sheet 1

INVENTOR.
Glenn J. Battaglia
BY
Brown and Mikulka
Robert M. Ford
ATTORNEYS

United States Patent Office 3,229,607
Patented Jan. 18, 1966

3,229,607
PHOTOGRAPHIC PRODUCTS, PROCESSES AND
APPARATUS
Glenn J. Battaglia, Lexington, Mass., assignor to Polaroid Corporation, Cambridge, Mass., a corporation of Delaware
Filed Mar. 19, 1963, Ser. No. 266,238
1 Claim. (Cl. 95—75)

This invention relates to photography and, more particularly, to apparatus and processes particularly adapted for the production of specified photographic additive color screen elements.

In general, color screen elements comprise a screen pattern formed of a plurality of light-transmitting, colored elements which are each of an independent primary color and which are generally classifiable into different groups in accordance with the color thereof. Thus, a conventional three-color additive screen generally has a set or group of red-colored filter elements, a set of blue-colored filter elements and a set of green-colored filter elements. These filter elements are ordinarily in a mosaic or geometrical pattern in a random or regular distribution.

The production of color screen elements, in accordance with the prior art, may be classified into two major groups.

First, color screen elements may be prepared by totally mechanical means, as for example, by printing or ruling a dyeable substrate with a greasy ink formulation, in accordance with the desired filter pattern; subjecting the substrate to suitable coloration, in areas which do not possess the repellant ink mask; effecting removal of the mask; and repeating this procedure, in accordance with the geometrical pattern of filter elements desired, a sufficient number of times to provide the desired multiplicity of diversely colored filter elements.

A second mechanical method comprises printing a carrier substrate with the desired dye formulations in accordance with predetermined filter pattern and repeating this printing procedure a sufficient number of times to provide the multiplicity of color filter elements desired.

A third mechanical method comprises depositing, as an irregular filter screen pattern, a thin layer comprising a random distribution of small grains, such as starch grains, which have been independently colored with the primary colors desired for optical filtering effects.

The second major type of color screen production procedures comprises photomechanical methods of the type initially proposed by Ducos du Hauron in the nineteenth century, see "La Triplice Photographique et l'Imprimerie," 1897. These procedures comprise, in general, coating a suitable support or film base with an adhesive composition having coated thereon a sensitized colloid composition, as for example, dichromated gelatin; effecting exposure of the sensitized gelatin layer, through a suitable mask which provides an exposure pattern devised in accordance with the desired optical filter element arrangement; effecting differential hardening of the sensitized colloid in accordance with the exposure pattern; removing unexposed unhardened gelatin by washing; and then subjecting the remaining hardened colloid to a suitable dyeing procedure in order to provide a first-colored optical filter element series. This procedure is repeated, employing appropriate masks, as often as necessary to provide the number of optical filter element types desired in the final color screen element.

The preceding mechanical methods of producing color screen elements by mechanical printing or ruling methods inherently require a great number of mechanical exact printing steps to provide a finished product, and thus possess the relative high cost inevitable to such complexity of production. Because of the extreme difficulties of manufacture, and of the relative production costs in general, additive color screen elements by means of these processes has been extremely limited. Only the so-called Dufay process has had an extended production duration, but, nevertheless, only a relatively limited market.

Methods of producing mechanical mosaic type color screen elements have, in general, provided elements inherently possessing a lack of color balance, due to areas possessing a predominance of particles of one color, as a practical result of attempted random distribution. This problem of statistical clumping requires the employment of extremely fine colored grains in order that formation of random aggregates of the same color may be decreased. Attempts to avoid the problem of aggregates by this mechanism gives rise to the additional disadvantage that the thus-prepared units then require very fine grain emulsions and are thereby restricted to low speed photographic processes. Furthermore, due to the necessary increase of interfaces between filter elements per unit area, color saturation is extensively decreased. Experience has also shown that attempts to prevent overlapping of respective filter units, in this system, and to correct for the lack of true juxtaposition between respective filters have been, at best, inadequate to provide color filter screens of sufficient optical acuity to attain the desired commercial significance. The only commercial process of this type having extended duration produced the so-called Autochrome plate of Lumiere. This plate comprised a mosaic of red, green and blue starch grains which were allowed to settle onto a tacky glass surface and then flattened out into tiny filter elements, each about 0.015 millimeter in diameter.

Although initially proposed almost a century ago, photomechanical methods of preparing color screen elements have singly failed to attain commercial significance. This has been true irrespective of the fact that extensive research on such systems has been carried out during the intervening time interval.

One basic problem with regard to photomechanical systems has been encountered in calibrating the filter elements with sufficient accuracy, as regards their surface area, thickness and color intensity, to provide a commercially acceptable product.

A second, related, basic problem has been to insure that individual sensitive areas, ultimately forming the optical filter units, are subjected to substantially complete photoexposure throughout their total proscribed area, and that any parallax, resultant from the exposure source, be maintained at such a minimum level as to maintain optical filter element boundary areas with the requisite integrity.

Accordingly, it is a principal object of the present invention to provide apparatus and processes particularly adapted for the photomechanical production of specified photographic additive color screen film units.

Other objects of the invention will in part be obvious and will in part appear hereinafter.

The invention accordingly comprises the apparatus possessing the construction, combination of elements and arrangement of parts, the process which comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
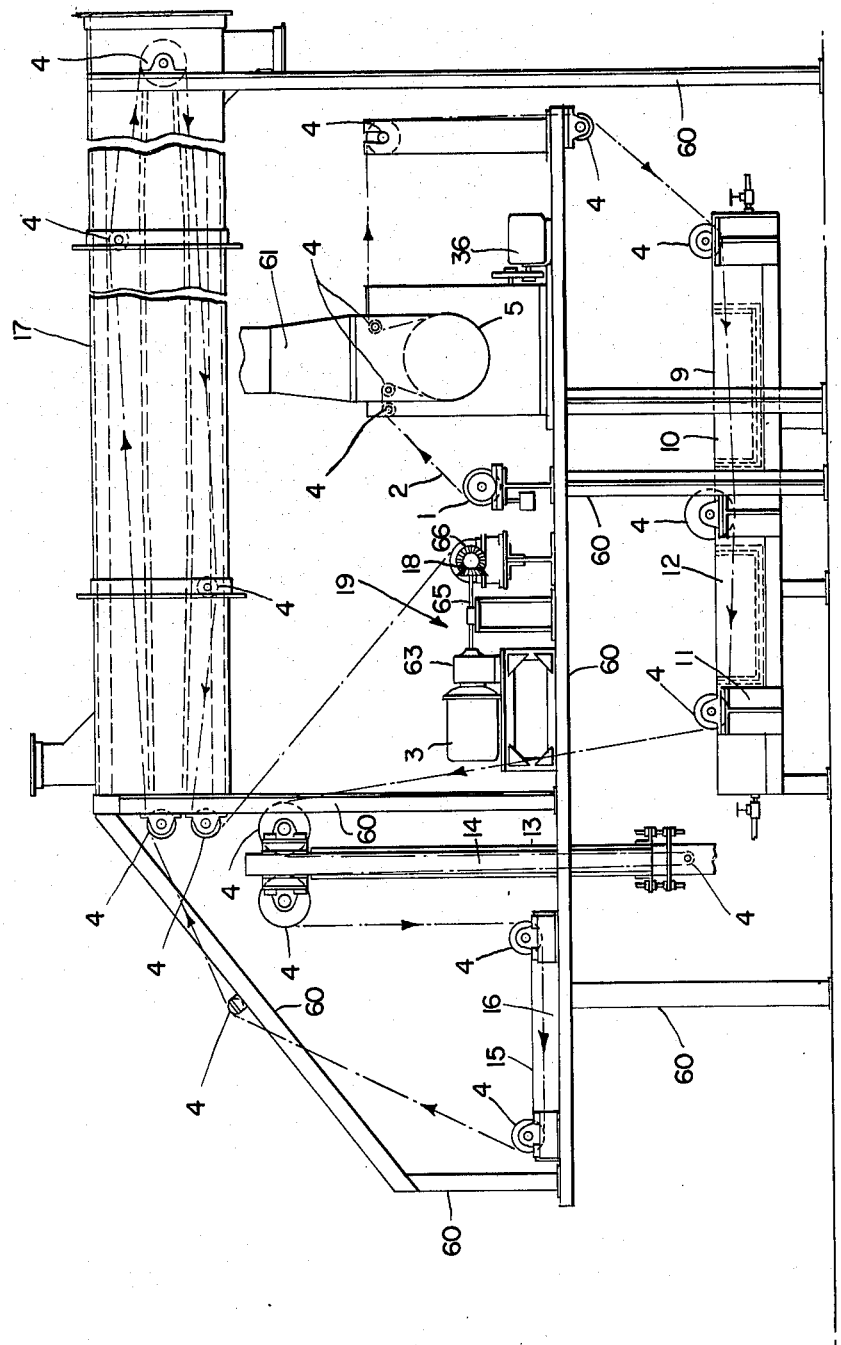
FIGURE 1 is a schematic side elevation illustrating the combination of elements comprising an apparatus adapted for the production of photographic color screen elements.
Figure 2:
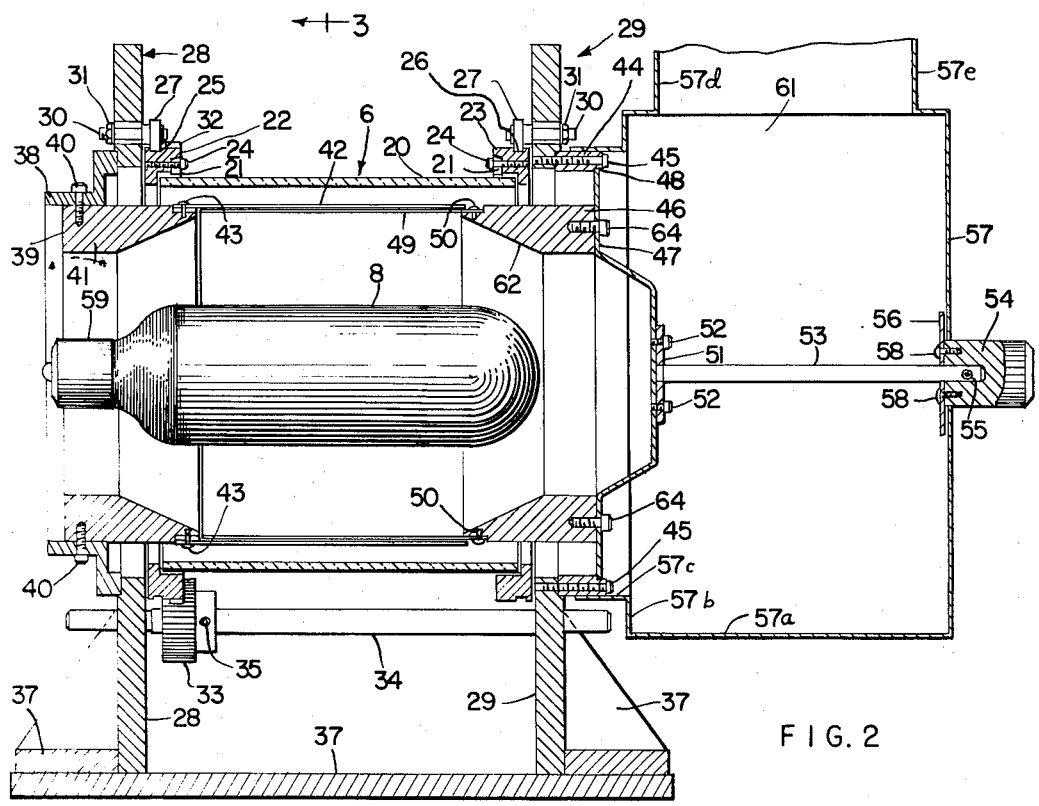
FIG. 2 is a schematic side elevation illustrating the combination of elements comprising a photoexposure mechanism adapted for use in the apparatus of FIGURE 1.
Figure 3:
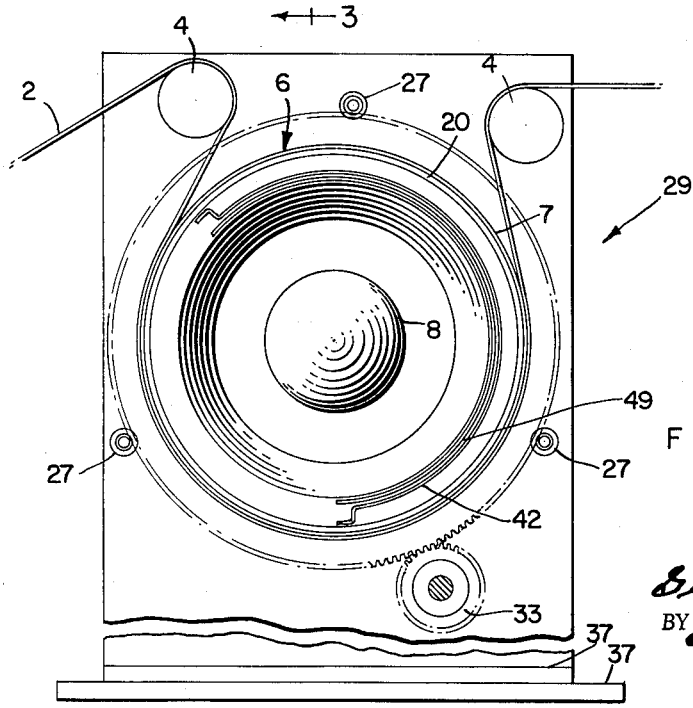
FIG. 3 is a schematic front elevation illustrating the combination of elements comprising the photoexposure mechanism of FIG. 2.

Referring now to FIGURE 1, there is shown an apparatus constructed in accordance with the present invention. FIGS. 2 and 3 show a specific photoexposure mechanism for use in the apparatus of FIGURE 1. Here there is shown a freely rotatable, cylindrical web supply drum 1 supplying a continuous web 2 comprising a suitable film base, such as a cellulose derivative film base, for example, a cellulose triacetate film base, having subcoated thereon an adhesive lacquer layer, such as a nitrocellulose lacquer layer, which has overcoated thereon a selectively photoresponsive, preferably polymeric, layer such as an approximately 4 microns (dry weight) thick potassium or ammonium dichromate sensitized gelatin layer. The transport of continuous web 2 is effected by electric drive motor 3, providing positive rotation of web storage drum 18 through transmission 19 comprising gears 66, drive shaft 65 and slip clutch 63, in concert with rotating cylindrical drum exposure mechanism 5. During transport, web 2 is maintained over a prearranged travel path by means of designated multiplicity of position rollers 4.

In the operation of the apparatus, the photoresponsive dichromate sensitized gelatin layer of travelling web 2 is brought into tangential contact with external exposure surface 6 of positive drive rotating cylindrical drum exposure mechanism 5, whereby the photoresponsive gelatin layer is in direct contact with external exposure surface 6, and receives an exposure, in accordance with a selected grid pattern 7, in contiguous contact therewith, preferably of short duration, on a continuous basis, from an ultraviolet source 8.

The preferred grid or mask pattern employed comprises a pattern of alternating transparent and opaque areas, the light-permeable areas comprising about one third of the total mask area.

Subsequent to photoexposure, web 2 is transported into wash tank 9 wherein the photoexposed and thereby differentially hardened gelatin of the photoresponsive layer is contacted with agitated water 10, maintained at a temperature within the range of about 80 to 140° F., preferably by pressure spraying of web 2, for a time interval of about 3 to 60 seconds, in order to effect removal of unexposed, and thus unhardened, gelatin, in accordance with the selective exposure pattern.

Web 2 is then transported into wash tank 11 wherein the hardened gelatin grid is subjected to a current 12 of water flowing counter to the path of web transport, in order to remove any possible residual debris and unhardened gelatin.

Continuous web 2 is then transported through dye tank 13, containing dye solution 14 comprising a dye substantive to the gelatin grid, generally a primary red color acid dye, in order to provide the desired coloration to the first-formed optical filter elements. The contact time between travelling web 2 and dye solution 14 generally is of the order of about one minute, after which time web 2 is directed through wash tank 15 containing cold water 16 in order to effect removal of any residual or excess dye.

Web 2 is dried by passage through drying chamber 17, containing suitable air circulating mechanisms or radiant energy devices, such as infrared elements, adapted to effect drying of web 2. Subsequent to effecting drying of web 2, the same may be spooled on cylindrical web storage drum 18 for subsequent operations.

Alternatively web 2 may be continuously processed to completion of the multicolor screen element by coating the first optical filter element containing surface of web 2 with an adhesive lacquer layer. Subsequent to substantial drying of the lacquer coating, web 2 may then be overcoated with a second photoresponsive dichromate sensitized gelatin layer. Web 2 is then brought into tangential contact with the exposure surface of rotating cylindrical drum exposure mechanism 5, such that its film base is in direct contact with a grid 7 mounted on the external surface of transparent cylinder 20. Grid 7, at this stage, possesses a line pattern comprising alternate transparent and opaque strips, the transparent areas comprising about one third of the total grid area, positioned approximately at right angle, that is about 90°, to the long axis of the first-formed series of optical filter elements. Exposure of the photoresponsive layer is accomplished by radiation, preferably ultraviolet radiation, emanating from source 8 substantially in a plane parallel to the long axis of the mask's grating lines and selectively traversing, in order, through the grating overlay, the film base, and masked by the previously formed optical filter elements, so as to provide the desired photoexposure line pattern to the second photoresponsive layer.

The aforementioned orientation of the grating of grid 7 is restricted by the parallax problem which occurs during the exposure of the second set of optical filter elements. The mask during the second exposure consists of the first series of filter elements, which are in contiguous contact with the photoresponsive layer, and grating overlay 7 mounted on cylinder 20 which is generally about 0.005 inch away. Therefore, with regard to employment of the preferred, illustrated line source exposure unit, care must be taken to insure that the rays, from the exposure source, be in radial planes which are substantially perpendicular to the surface of the grating, at the point of incidence, that is, that incident rays be in a plane which is substantially perpendicular to the surface of the grating at each point of incidence and which is substantially parallel to the grating lines, in order to avoid resultant parallax which would provide uneven exposure formation of the second series of optical filter elements. Furthermore, care must be observed in order that the line pattern of the second optical filter element's series is formed at an angle approximating 90° to the longitudinal axis of first series of optical filter elements. The closer to a right angle obtained in the formation of the second series of optical filter elements, the less interface formation, and thereby the greater color saturation achieved during photographic employment of the resultant color screen element.

The aforementioned illustrated line source exposure unit, in contradistinction to point source exposure units, provides more uniform exposure and thereby more uniform color balance.

The continuous web is then processed, dyed, preferably with an acid dye of green coloration, and dried in accordance with the previously detailed description.

At this point in the process, the web, now containing a first and second series of optical filter elements, may be spooled on a storage cylinder, such as cylinder 18, for subsequent operations and/or employment.

In the alternative, a third series of optical filter elements may be immediately formulated by coating the external surface of the second optical filter element series with an adhesive lacquer and overcoating the lacquer coating with a third photoresponsive dichromate sensitized gelatin layer. The web is then transported into tangential contact with exposure surface 6 of the rotating cylindrical drum mechanism, such that the external surface of the film base is in direct contact with transparent cylinder 20. Exposure of the photoresponsive layer is accomplished by radiation traversing through the film base and, masked by the previously formed optical filter elements, thereby providing photoexposure formation of a third series of optical elements, in apparent contiguous relationship to the first and second series of optical filter elements, with respect to actinic radiation traversing through the filter screen perpendicular to the axis of its main plane.

The continuous web is then processed, dyed, preferably with an acid dye of blue color, dried and stored, in accordance with the aforementioned procedures.

Optionally, the thus-formed multicolor screen may be overcoated with a protective polymeric composition, such as nitrocellulose, cellulose acetate, etc., prior to the external surface thereof having a panchromatically sensitized photographic emulsion or a diffusion transfer print-receiving layer applied thereto.

Referring now generally to FIGS. 2 and 3, rotating cylindrical drum mechanism 5 comprises a transparent cylinder 20, which may have an appropriate mask 7 positioned contiguous the external surface of cylinder 20. At each end of transparent cylinder 20, drum clamps 21 manually effect attachment of transparent cylinder 20 to respective cylinder bearing track rings 22 and 23. Cylinder drum clamps 21 themselves are affixed to cylinder bearing track rings 22 and 23 by retaining screws 24. Bearing tracks 25 and 26 are each positioned, respectively, so as to be engaged by freely rotating bearings 27, mounted on side plates 28 and 29 by respective bolt and nut combinations 30 and 31. Cylinder bearing track ring 22 is provided with positive drive rotating motion by means of engagement between truarc ring 32 and spur gear 33. Rotating of spur gear 33 is provided by means of drive shaft 34, which is at one end fixedly mounted to spur gear 33 by roll pin 35 and at the opposite end engaged to electric motor 36 by a suitable gear train (not shown). Side plate 28, mounted on support members 37, the latter in turn being mounted on support members 60, has mounted thereon end load bearing cap 38, to which is affixed immovable outer shield shutter 39 by means of screws 40. Outer shield shutter 39 comprises shutter mount 41 having affixed thereto outer shutter blade 42 by means of screws 43. End load bearing cap 38 has mounted, by braces (not shown), intermediate its circumference, electrical power socket 59 adapted to retain an ultraviolet radiation source, as for example, mercury arc lamp 8. Side plate 29, mounted on support members 37, has mounted thereon shutter seating ring 44 by means of screws 45. Inner shutter 46 is rotatably positioned by maintenance of shutter pivot seating bracket 47 in flange 48 of inner shutter seating ring 44. Rotatable inner shutter 46 comprises inner shutter blade 49 affixed to shutter mount 62 by means of screws 50. Shutter mount 62 in turn is affixed to inner shutter pivot seating bracket 47 by means of screws 64. Inner shutter seating bracket 47 has affixed thereto mounting plate 51 by means of screws 52, which mounting plate 51 has journaled thereto shutter turning post shaft 53. Shutter turning post 53, in turn, has affixed to the terminal portion thereof hand turning knob 54 by means of roll pin 55. Rotatable inner shutter 46 is maintained in engagement with flange 48, of shutter seating ring 44, during and subsequent to rotation of same, by means of shutter bearing plate 56, journaled to turning post shaft 53 and possessing an arc of rotation against the inner surface of wall 57. Shutter bearing plate 56 is affixed to inner shutter hand knob 54 by means of screws 58 and shutter seating ring 44 is affixed to side plate 29 by screws 45. Walls 57, 57a, 57b, 57c, 57d and 57e together form air duct 61 having mounted therein suitable air evacuating means, such as an exhaust fan (not shown) to provide a flow of cool filtered air, from suitable supply ducts (not shown), through the internal chamber formed by the rotating drum mechanisms, whereby to prevent the accumulation of heat produced by operation of exposure source 8.

The shutter mechanism, as illustrated in FIG. 3, is shown in a position of maximum aperture. Both fixed shutter 39 and rotatable shutter 46 each have a sector cut from their respective shutter blades 42 and 49, of substantially equal amount, and extending the length of cylinder 20. Thus, shutter blade 49, of rotatable inner shutter 46, mounted as previously described for free rotation, may be moved with respect to fixed shutter blade 42 to provide an adjustable width slit for exposing web 2, whereby exposure of web 2 may be suitably controlled according to the speed of web 2, in relation to the quantum of exposure necessary to provide the response to the photoresponsive layer desired.

For use in diffusion transfer multicolor additive photographic systems, the preferred film units have a panchromatically sensitized photographic emulsion coated on the external surface of the aforementioned print-receiving layer, either with or without a stripping layer positioned intermediate the print-receiving layer and emulsion layer, to facilitate separation of the emulsion layer subsequent to transfer processing. The stripping layer itself may comprise a polymeric substance, such as hydroxyethyl cellulose, cellulose acetate hydrogen phthalate, etc.

Diffusion transfer additive photographic processes are disclosed in U.S. Patents Nos. 2,614,926; 2,726,154; 2,944,894; and 2,992,103, issued October 21, 1952; December 6, 1955; July 12, 1960; and July 11, 1961, respectively.

Particularly desirable transfer process results are obtained when the silver-precipitating agents in the image-receiving layer are disposed in a matrix comprising a macroscopically continuous stratum comprising submacroscopic agglomerates of minute particles of a suitable water-insoluble, inorganic, preferably siliceous material, such, for example, as silica aerogel. Suitable matrices of this type are disclosed in U.S. Patent No. 2,698,237.

The image-receiving layer may itself be comprised of one or more strata of a permeable substantially transparent material. As examples of image-receiving materials of such a nature, mention may be made of: regenerated cellulose; polyvinyl alcohol; partially hydrolyzed polyvinyl acetate; sodium alginate; celluose ethers, such as methyl cellulose or other cellulose derivatives such as sodium carboxymethyl cellulose or hydroxyethyl cellulose; proteins, such as gelatin or glue; carbohydrates, such as gums and starches; and mixtures of such materials, as for example, polyvinyl alcohol and gelatin, where they are compatible.

It will be recognized that the silver-receptive stratum should be so constituted as to provide an unusually vigorous elemental silver precipitating environment which causes the elemental silver deposited therein, in comparison with the amount of silver developed in the silver halide photosensitive layer, to possess very high covering power, that is, opacity per given mass of reduced silver.

Especially suitable as silver precipitating agents are the metallic sulfides and selenides, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$ and especially the salts of zinc, cadmium and lead. Also suitable as precipitating agents are heavy metals such as silver, gold, platinum, palladium, and mercury, and in this category the noble metals are preferred and are generally provided in the matrix as colloidal particles.

As disclosed in U.S. Patent No. 2,698,244, issued December 28, 1954, diffusion transfer processing may be effected by disposing a liquid processing composition in a rupturable container so positioned in regard to the appropriate surface of a silver halide emulsion that, upon compression with a spreader sheet, a substantially uniform layer of processing composition is distributed over the surface of said photosensitive emulsion, positioned distally from the image-receiving layer. The processing composition may be one of the film-forming processing compositions disclosed in U.S. Patent No. 2,543,181, issued February 27, 1951. It may comprise, for example, a developing agent such as hydroquinone, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing liquid prior to the application thereof, but they may be in part or wholly added to the processing composition as it is spread between the spreader sheet and the photosensitive silver halide emulsion, said agents being so located on or adjacent to the surface of one or both of said layers as to be dissolved by or otherwise interacted with the liquid agent when the latter wets said surface.

In carrying out the aforementioned transfer process, the photo-sensitive silver halide emulsion is photoexposed to form therein a latent image. A substantially uniform distribution of processing composition is distributed on the external surface of said emulsion, as for example, according to the previously described procedure. Processing composition reagents permeate into the photosensitive emulsion, developing the latent image contained therein according to the point-to-point degree of exposure of said emulsion. Substantially contemporaneous with the development of the latent image, an imagewise distribution of soluble silver complex is formed from unexposed silver halide within said emulsion. At least part of said silver complex, solubilized, is transferred, by imbition, to the print-receiving stratum. The transferred silver complex is reacted to provide a positive, reversed image of the latent image. Subsequent to formation of the positive image in the image-receiving layer, dissociation of said layer from the emulsion layer may be effected.

It must be noted that abrasion-resistant properties may be provided to the image-receiving layer, by the inclusion therein of deacetylated chitin, as disclosed in the copending U.S. application of William H. Ryan et al., Serial No. 808,123, filed April 22, 1959, which alleviates the necessity of subsequently overcoating the external surface of image-receiving layer with a transparent abrasion-resistant water-insoluble plastic, to prevent laceration and resultant degradation of the positive image, subsequent to removal of the emulsion from contact therewith.

The concentration of deacetylated chitin disposed in the image-receiving layer may be varied over a wide range according to the degree of rigidity desired, during and subsequent to processing, and the thickness and character of the image-receiving stratum employed.

Other materials may be substituted for those used in the foregoing photographic process and the proportions may be varied to an appreciable extent. For example, the film-forming material in the processing composition which imparts the desired viscosity to the latter may be any of the high molecular weight polymers which are stable to alkali and which are soluble in aqueous alkaline solutions. For example, such other plastics as hydroxyethyl cellulose, polyvinyl alcohol, and the sodium salts of polymethacrylic acid and polyacrylic acid may be used. The plastic is preferably contained in the processing composition in sufficient quantity to impart to the composition a viscosity in excess of 1,000 centipoises at a temperature of approximately 20° C. Preferably, the viscosity of the processing composition is of the order of 1,000 to 200,000 centipoises.

Other developing agents may be used, for example, one of the following: p-aminophenol hydrochloride; bromohydroquinone, chlorohydroquinone; diaminophenol hydrochloride; diaminophenol dihydrochloride; toluhydroquinone; monomethyl-p-aminophenol sulfate; a mixture consisting by weight of ½ hydroquinone and ½ p-hydroxyphenylaminoacetic acid; and a mixture consisting by weight of ¼ hydroquinone and ¾ p-hydroxyphenyl-amino-acetic acid.

To form the soluble silver complex, such other complex-forming substances as sodium thiocyanate, ammonium thiocyanate and ammonia may be employed.

The present invention will be illustrated in greater detail in conjunction with the following specific example which sets out a representative fabrication and employment of the additive multicolor film units of the present invention, which, however, is not limited to the detailed description herein set forth but is intended to be illustrative only.

A cellulose triacetate film base was first coated with an adhesive composition containing 70 cc. of methanol, 1.25 grams of nitrocellulose, and 30 cc. of butyl alcohol. A first layer of gelatin, which had been sensitized by the addition of 15 weight percent potassium dichromate (based on dry gelatin), was then coated on the external surface of the first adhesive layer. The first gelatin layer was then exposed, in accordance with the previously detailed disclosure, and the resultant photoexposed carrier subjected to the described water wash steps to provide removal of unexposed sensitized gelatin, in accordance with the exposure pattern contained in the first gelatin layer. The web was then treated with an acid dyeing bath containing Direct Red C. I. 81 1.17%, Direct Yellow C. I. 4 0.32%, and 2.95% glacial acetic acid. The web was then rinsed to effect removal of excess dye, dried and a second adhesive composition containing 70 cc. of methanol, 30 cc. of butyl alcohol, and 1.25 grams of nitrocellulose was overcoated thereon. A second layer of gelatin which had been sensitized by the addition of 15 weight percent potassium dichromate was then coated on the second adhesive layer. The second photosensitized gelatin layer was then exposed by ultraviolet radiation traversing through a second mask in direct contact with the external surface of the cellulose triacetate film base and the first formed optical filter elements, in accordance with the previously detailed disclosure. The second gelatin layer was then washed with water to effect removal of unexposed photosensitive gelatin, in the manner previously detailed. The remaining gelatin resist was dyed by contact with an acid dyeing solution containing Acid Green C. I. 7 0.83%, Direct Yellow C. I. 4 0.32%, Acid Green C.I. 22 0.78%, and 2.86% glacial acetic acid. The web was then rinsed to effect removal of any residual excess dye, dried and then coated with a third adhesive composition comprising 30 cc. butanol, 1.25 grams of nitrocellulose, and 70 cc. of methanol. A third layer of gelatin which had been sensitized with 15 weight percent potassium dichromate was then coated on the external surface of the third adhesive layer. The third photosensitive gelatin layer was subjected to exposure by ultraviolet radiation traversing through the cellulose triacetate film base and the first and second formed optical filter elements to provide the desired exposure pattern, in accordance with the description detailed previously. The third layer of photosensitive gelatin was then washed in order to provide the desired resist formation, in accordance with the previously detailed disclosure, and the resultant resist was then dyed by treating with a solution containing Blue T Pina 1.0% and 1% glacial acetic acid. A protective overcoat layer was then provided by coating the external surface of the multicolor screen element with a composition comprising 70 cc. methanol, 30 cc. butanol, and 5 grams of nitrocellulose. A diffusion transfer image-receiving layer comprising a silver-receptive stratum containing silver precipitating nuclei dispersed in a matrix of deacetylated chitin containing gelatin was then coated on the external surface of the protective layer, according to the practice described in the aforementioned U.S. application Serial No. 808,123. The image-receiving layer was then overcoated with a panchromatic silver iodobromide gelatin emulsion.

The thus-formed additive multicolor diffusion transfer film unit was then exposed to a predetermined subject and the latent image contained in the emulsion was diffusion transfer processed by contact thereof with a diffusion transfer processing composition, according to the practice previously described. After an imbibition period of approximately 60 seconds, the emulsion, together with the processing composition, was stripped from contact with the image-receiving layer to uncover a positive transfer print formed in the image-receiving layer.

Projection of the resultant additive multicolor print showed satisfactory contrast, density and range.

It may be found that after the dyeing of layers of monochromatic filter elements, there may tend to remain, even after rinsing, a molecular film of the dye over the areas previously stripped. Under these circumstances, it may be preferred to forcibly separate the excess dye from the unexposed areas and this may be accomplished by directing vigorous air blasts in the direction parallel to the longest side of the particular areas being operated on.

Although acidic or basic dyes may be used in the present process, it is highly desirable to use acidic dyes which are generally considered to be more durable and to possess better tone. Various suitable wetting agents may also be added to the dye solutions to further insure a thorough penetration of the dye into the desired areas.

Various colors and numbers of colors may be used in this invention but the basic system is a tricolor arrangement of the three primary colors, red, green and blue. A four-color system such as red, green, violet-blue and orange-yellow could be used also, by a sequential employment of three masks possessing transparent areas approximately one fourth of the respective total mask area, followed by a fourth overall exposure by the thus-formed filter elements, in accordance with the teachings of the instant disclosure.

Particular advantages arise from the instant apparatus and process in that it possesses the ability to expose a line pattern on a web moving continuously and at a substantially uniform velocity. The instant apparatus and process also avoids the employment of conventional "step and repeat" operations with flat plattens which require more complex machining, introduce innumerable seams, and are subject to extreme variations in exposure from point to point. Furthermore, the cylinder exposure surface of the instant apparatus provides excellent contact with the continuous web and the cylindrical exposure mechanism insures that exposure rays are incident on the exposure surface in proper relationship, without the need for collimating optics.

It is desirable of course that the adhesion of the carrier, the three monochromatic filter layers, etc., should be very secure so that the individual structures will remain bonded during the manufacture and processing of the finished product, and further that there will be subsequently no mechanical separation of the various layers which will create optical and mechanical difficulties.

Under these circumstances, it is particularly desirable that adhesive or lacquer layers be interposed between respective layers and filter elements. The adhesive layer selected should be one which does not deleteriously interfere with the transparency of the final product, and yet provides sufficient adhesive capacity so as to allow vigorous treatment of the film unit during and subsequent to its production. The aforementioned nitrocellulose has been found to be a highly desirable bonding agent, although other adhesives known in the art for the instant purposes may be employed, where desired.

The bond obtained throughout the entire unit by this invention should be sufficient to withstand the vigorous treatment such as air blasting and heat to which the unit may be exposed. Moreover, there should be no local separation of the various layers during mechanical treatments that would cause spots, particularly on magnification.

If gelatin is used for the photoresponsive layer, is has also been found that potassium thiocyanate is an excellent solvent for selectively removing the unexposed gelatin. The unexposed potassium dichromate, generally used for sensitizing the gelatin, may be first washed away with cold water and then the unexposed gelatin removed in a bath of KSCN. The time required for such stripping step varies with the concentration of the bath.

Although for photographic purposes the panchromatic emulsion layer could be applied to the rear side of the carrier, for practical purposes it is necessary to coat the emulsion on the color screen side of the carrier to provide high color saturation.

After exposure of this film a latent image is formed in the emulsion layer and this may be processed in the same manner as black and white images are processed, without regard to the filter screen which is spaced between the carrier and the panchromatic emulsion, particularly where the filter screen is protected by a protective polymeric composition.

When a positive transparency film is desired, the image also may be reversed in the conventional manner, in addition to the previously detailed diffusion transfer photographic processes.

Though aproximate, it may be said that screen patterns above described comprise as an average about 1200 separate filter elements per square millimeter when the first formed optical filter units comprise a discontinuous line pattern and about 820 separate filter elements when the first formed units comprise a continuous line pattern.

In the description herein, each color series of filter elements has been described as covering a part of the total area in direct proportion to the total number of colors used, i.e., in the tri-color system, each color occupies one-third of the total area. This may vary quite widely before having a noticeable effect to the observer and in fact may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Mask 7 may be provided by photomechanical ruling or engraving of a suitable flexible polymeric substrate, in accordance with procedures well known to the art for the formation of line patterns comprising alternating opaque and transparent line areas, and preferably comprising in the order of 15 to 30 opaque lines per millimeter. Mask 7 may be maintained in contigous contact with the external surface of transparent cylinder 20 by either mechanical retention devices or chemical adhesion or a combination thereof. Preferably, mask 7 is temporarily affixed to the surface of cylinder 20 by mechanical retaining means, such as pressure-sensitive tapes, in order to provide for ready replacement of grid masks.

As an alternative procedure, a cylinder may have the desired masking pattern directly formed thereon and/or therein by ruling and/or engraving procedures. For example, the cylinder may be engraved by a cutting tool in a system similar to the engraving of defraction gratings, such that the desired series of lines extend in accordance with the selected mask pattern. When engraving the transparent cylinder, care must be exercised in not stripping off any small chips of the cylinder's material, which would detrimentally affect the optical qualities of the resultant grid pattern. This problem may be avoided by coating the transparent cylinder, before engraving, in accordance with methods well known in the art. For example, a glass cylinder may be coated with a very thin alumina layer to prevent chipping. The engraved grooves are then filled with an opaque substance such as China ink, which will preferably fix itself on the rough walls of the engraved grooves. Excess remaining on the polished surface will not adhere strongly and can be merely scratched off or scraped away.

The cylinder may also be provided by first coating a transparent cylinder with an opaque material and then removing same by engraving to form continous spaced transparent strips on the cylinder surface.

The transparent cylinder employed may itself be fabricated from any light-permeable substance possessing the requisite degree of dimensional stability such as glass or synthetic polymeric compositions, as, for example, Plexiglas.

As further examples of compositions suitable for employment as the photoresponsive layer of the web, mention may be made of photosensitized albumin, casein, gum arabic, polyvinyl alcohol, and other light-sensitive polymers known in the art as adapted for employment in photomechanical reproduction, particularly those known for the production of resists by photomechanical means.

Various types of flexible film bases or supports, for example, polymeric films of both the synthetic types and those derived from naturally occurring products, etc., may be employed. Especially suitable materials include polymethacrylic acid methyl and ethyl esters; vinyl chloride polymers; polyvinyl acetals; polyamides such as nylon; polyesters such as the polymeric films derived from ethylene glycolterephthalic acid; and cellulose derivatives such as cellulose acetate, triacetate, nitrate, propionate, butyrate, acetate-propionate, or acetate-butyrate.

As examples of additional dyes for effecting coloration of the optical filter units, mention may be made of fast red dyes such as Acid Reds C.I. 1 and C.I. 34, which may be mixed with Direct Red C.I. 24, Acid Yellow C.I. 36 or Direct Yellow C.I. 4; acid green dyes such Acid Green Pina (trade name of Farbwerke Hoechst Ag., Frankfurt, Germany, for a triphenyl methane dye) which may be mixed with the above yellow dyes; and acid blue dyes such as Acid Blue C.I. 27.

Since certain changes may be made in the above processes, products and apparatus without departing from the scope of the invention herein involved, it is intended that all matter contained in the above description shall be interpreted as illustrative and not in a limiting sense.

What is claimed is:

Apparatus for producing photographic color screen elements, said apparatus comprising, in combination:

(a) rotatably mounted roll supply means adapted to support a continuous web in roll form, said web comprising a transparent film having a continuous distribution of photosensitive material on one surface;

(b) a rotatably mounted, hollow cylinder carrying on the external surface thereof a continuous pattern of alternate transparent and opaque areas;

(c) guide means for feeding said web longitudinally from said supply means into contact with said external surface over at least half the circumference of said cylinder;

(d) drive means engaging said cylinder and rotating the latter in the direction of travel of said web, whereby movement of said web is at least partially effected by contact thereof with said cylinder;

(e) a line source of radiation actinic to said photosensitive material positioned internally of said hollow cylinder to emit rays of light which are normal to each point on said external surface for exposing the portions of said photosensitive material contiguous with said transparent areas;

(f) a first, opaque, arcuate blade having an elongated aperture extending parallel to the long axis thereof and fixedly arranged concentrically within said hollow cylinder between said source of radiation and said external surface, thereby occluding passage of said rays in areas other than that of said aperture;

(g) a second, opaque, arcuate blade arranged concentrically with respect to said first blade and continuously adjustable with respect to said first blade between covering relation, wherein said aperture is completely covered by said second blade to fully occlude passage of said rays from said source of radiation to said photosensitive material, and uncovering relation, wherein said rays may pass through that portion of said aperture which is uncovered by said second blade;

(h) a manually engageable control member selectively movable to adjust the position of said second blade relative to said first blade, thereby changing the effective size of said aperture through which said rays may pass;

(i) first container means arranged in the path of advancement of said web subsequent to said cylinder, for holding a liquid developer adapted to remove unexposed portions of said photosensitive material from said web to provide resist formation to said web;

(j) second container means arranged in the path of advancement of said web subsequent to said first container means, for holding a dye solution adapted to effect dyeing of said resist;

(k) drying means arranged in the path of advancement of said web subsequent to said second container means for effecting drying of the dyed resist-carrying web; and (l) roll take-up means arranged to wind said dyed resist-carrying web in roll form subsequent to passage thereof through said drying means.

References Cited by the Examiner

UNITED STATES PATENTS

| | | | |
|---|---|---|---|
| 1,542,923 | 6/1925 | Urguhart | 95—75 |
| 2,774,290 | 12/1956 | Mormann | 95—77.5 |
| 2,840,470 | 6/1958 | Jaffe et al. | 96—35 |
| 2,864,700 | 12/1958 | Chevalier | 96—35 |
| 2,900,889 | 8/1959 | Jaffe et al. | 95—77.5 |
| 2,946,272 | 7/1960 | Eisner et al. | 95—77.5 |
| 3,003,404 | 10/1961 | Metcalfe et al. | 95—1.7 |
| 3,107,595 | 10/1963 | Pike | 95—77.5 |

FOREIGN PATENTS 648,116   12/1950   Great Britain.

EVON C. BLUNK, *Primary Examiner.*

NORMAN C. TORCHIN, *Examiner.*